(12) United States Patent
Amir

(10) Patent No.: US 6,212,890 B1
(45) Date of Patent: Apr. 10, 2001

(54) GEOTHERMAL POWER PLANT AND CONDENSER THEREFOR

(75) Inventor: Nadav Amir, Rehovot (IL)

(73) Assignee: Ormat Industries Ltd., Yavne (IL)

(*) Notice: Subject to any disclaimer, the term of this patent is extended or adjusted under 35 U.S.C. 154(b) by 0 days.

(21) Appl. No.: 09/307,877

(22) Filed: May 10, 1999

Related U.S. Application Data

(63) Continuation-in-part of application No. 08/689,846, filed on Aug. 14, 1996, now Pat. No. 5,970,714, which is a continuation of application No. 08/261,048, filed on Jun. 14, 1994, now abandoned, which is a continuation of application No. 07/955,454, filed on Oct. 2, 1992, now abandoned.

(51) Int. Cl.⁷ ........................................... F03G 7/00
(52) U.S. Cl. .......................... 60/641.2; 60/641.5; 60/648
(58) Field of Search ............................... 60/641.2, 641.5, 60/648

(56) References Cited

U.S. PATENT DOCUMENTS

| | | | |
|---|---|---|---|
| 5,607,011 | * 3/1997 | Abdelmalek | ........................... 60/648 |
| 5,671,601 | * 9/1997 | Bronicki et al. | ..................... 60/641.5 |
| 5,694,772 | * 12/1997 | Weinberg et al. | .............. 60/641.5 X |
| 5,970,714 | * 10/1999 | Bronicki et al. | ................ 60/641.5 X |

* cited by examiner

*Primary Examiner*—Hoang Nguyen
(74) *Attorney, Agent, or Firm*—Nath & Associates PLL; Gary M. Nath; Jerald L. Meyer

(57) ABSTRACT

A geothermal power plant operating on geothermal fluid includes a source of low pressure geothermal steam, and a turbo-generator including a low pressure steam turbine to which the geothermal steam is applied, and a generator coupled to the steam turbine. The low pressure geothermal steam is applied to the turbine, wherein expansion takes place driving the generator, and producing expanded steam that is exhausted from the turbine. A condenser for condensing the expanded steam includes a steam heat exchanger for receiving the expanded steam and a fan for cooling the expanded steam such that steam condensate is produced.

10 Claims, 1 Drawing Sheet

GEOTHERMAL POWER PLANT AND CONDENSER THEREFOR

"This application is a Continuation-In-Part Application of Ser. No. 08/689,846 which was filed on Aug. 14, 1996 and issued as U.S. Pat. No. 5,970,714, which is a continuation of Ser. No. 08/261,048 filed on Jun. 14, 1994, now abandoned, which is a continuation of Ser. No. 07/955,454 filed on Oct. 2, 1992, now abandoned."

TECHNICAL FIELD

This invention relates to geothermal power plants and to an improved condenser therefor.

BACKGROUND

Producing power from geothermal heat sources currently is being carried out on a wide scale throughout the world. In many installations, hot geothermal fluid extracted from a production well is flashed into steam in a separator that produces geothermal steam rich in non-condensable gases, such as hydrogen sulfide, carbon dioxide, etc. The brine that remains is sometimes so corrosive, and sometimes contains such a high concentration of silica, that from an engineering standpoint, it must be disposed of in a re- injection well without using a significant amount of heat contained therein.

The geothermal steam produced from the separator is applied to a steam turbine coupled to a generator, the steam expanding in the turbine and driving the generator which produces electricity. Condensing expanded steam in the turbine exhaust is often a problem when an inadequate supply of ambient cooling water is available. Usually, the expanded steam contains noxious gases which, for environmental reasons, precludes the use of an open system condenser, such as cooling towers, for condensing the steam even when ambient water is available. Under such conditions, chemical pre-treatment of the exhaust steam is usually required to suppress escape of the non-condensable gases. This can be an expensive, and complex, solution to the problem.

It is therefore an object of the present invention to provide a geothermal power plant and a condenser therefor which is capable of operating without significant amounts of ambient cooling water, and which avoids the problems described above.

BRIEF DESCRTIPTION OF THE INVENTION

A geothermal power plant operating on geothermal fluid according to the present invention includes a source of low pressure geothermal steam, and a turbo-generator including a low pressure steam turbine to which the geothermal steam is applied, and a generator coupled to the steam turbine. The low pressure geothermal steam is applied to the turbine wherein expansion takes place driving the generator and producing expanded steam that is exhausted from the turbine. A condenser for condensing the expanded steam includes an air-cooled heat exchanger. A condenser of this type is ideally suited for such steam turbine installations since they are very simple. Furthermore, these steam turbine installations can be used even where an adequate supply of ambient cooling water is not available.

Preferably, non-condensable gases are removed to prevent these gases from affecting the efficiency of the operation of the air-cooled heat exchanger.

When the geothermal fluid that supplies the source of low pressure geothermal steam is derived from a low pressure geothermal production well, the source of low pressure geothermal steam may include a separator for receiving geothermal fluid from the low pressure production well, and separating the fluid into brine and low pressure geothermal steam. In such case, non-condensable gases in the steam may be removed from the steam heat exchanger thus improving the heat transfer characteristics of the condenser.

When the geothermal fluid that supplies the source of low pressure geothermal steam is derived from a production well at a pressure higher than the low pressure well described above, the source of geothermal steam may include a separator for receiving geothermal fluid from the production well, and separating the fluid into brine and higher pressure steam. In this case, however, the source of low pressure steam comprises a primary turbo-generator that includes a steam turbine coupled to a generator. The higher pressure steam is applied to the steam turbine of the primary turbo-generator wherein the steam expands driving the generator and producing primary exhaust steam. A primary heat exchanger receives the brine, which, in cooperation with the primary exhaust steam, establishes the source of low pressure geothermal steam.

When the production well produces intermediate pressure geothermal fluid, the primary heat exchanger may be an indirect contact re-heater having two sides, one that receives the brine, and the other that receives the primary exhaust steam from the turbine of the primary turbo- generator. The re-heater reheats the primary exhaust steam to form the source of the low pressure geothermal steam.

When the production well produces geothermal fluid at a pressure higher than the intermediate pressure previously described, the primary heat exchanger may be in the form of a flash chamber for receiving brine from the separator and producing flashed steam which is combined with the primary exhaust steam from the steam turbine of the primary turbo-generator. In this case, the combination of primary steam exhausted from the turbine of the primary turbo-generator with the steam flashed from the brine forms the source of low pressure geothermal steam.

When high pressure geothermal fluid is produced by the production well, the turbo-generator that operates on low pressure geothermal steam can be combined with the primary turbo-generator by utilizing a multi-stage steam turbine. In such case, the input stage of the turbine would constitute the intermediate, or the high pressure stage, as the case may be, as described above, and the following stage of the turbine would constitute the low pressure stage described above.

BRIEF DESCRIPTION OF THE DRAWINGS

Embodiments of the present invention are described below and shown by way of example in the accompanying drawings, wherein.

DETAILED DESCRIPTION

Figure 1:
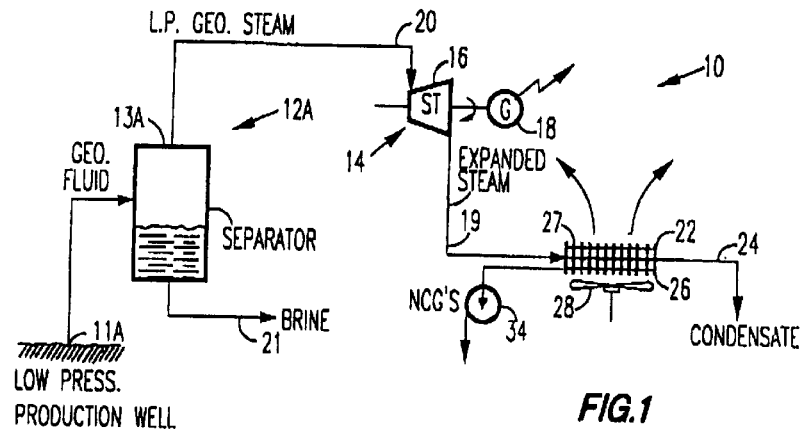
FIG. 1 is a block diagram of a geothermal power plant according to the present invention for utilizing geothermal fluid produced by a low pressure production well.

Referring now to the drawings, reference numeral 10 designates a power plant according to the present invention for generating power from geothermal fluid produced by low pressure production well 11A. Typically, a well that produces geothermal fluid which, after separation into brine and steam that have a temperature of between about 110–130° C., is referred to as a low pressure well.

Power plant 10 comprises source 12A of low pressure geothermal steam, and turbo-generator 14 which includes low pressure steam turbine 16 coupled to generator 18. Source 12A includes separator 13A that receives low pressure geothermal fluid from well 11A and separates the fluid into a vapor stream, and a liquid stream. The vapor stream that exits into conduit 20 constitutes the low pressure geothermal steam, and the liquid stream that exits into conduit 21 is constituted by brine. Conduit 20 connected to source 12 applies the low pressure geothermal steam to the turbine wherein expansion of the steam takes place driving generator 18 which produces electricity, and producing expanded steam in exhaust line 19.

Condenser 22 connected to exhaust line 19 receives expanded steam exhausted from turbine 16 and condenses the steam producing condensate in drain line 24. Condenser 22 includes steam heat exchanger 26 for receiving the expanded steam, and fan 28 for cooling steam present in steam heat exchanger 26. Preferably, compressor 34 is connected to steam heat exchanger 26 for the purpose of removing non-condensable gases from the steam heat exchanger, and pressurizing the gases for environmentally safe disposal, preferably in a re-injection well (not shown).

In operation, conduit 20 carries steam from source 12A to the input of steam turbine 16, thereby constituting means for applying steam from the source to the turbine. Expansion of the steam takes place in the turbine driving generator 18 which produces electricity, and expanded steam is produced that is applied to heat exchanger 26 within which are located a plurality of finned tubes 27 into which the expanded steam flows. The finned tubes are cooled with ambient air by operation of fan 29 which induces ambient air to flow over them. The removal of non-condensable gases from the condenser also contributes to the effectiveness of the condenser. Finally, tubes 27 are preferably of stainless steel to preclude or reduce damage by contact with the expanded geothermal steam.

Steam condensate can be disposed of by re-injecting it or used for other purposes, e.g. make-up water for neighboring cooling towers, irrigation, drinking water, etc. Furthermore, the extracted non-condensable gases can be released to the atmosphere or re-injected into a re-injection well, or first chemically treated before being disposed of.

Figure 2:
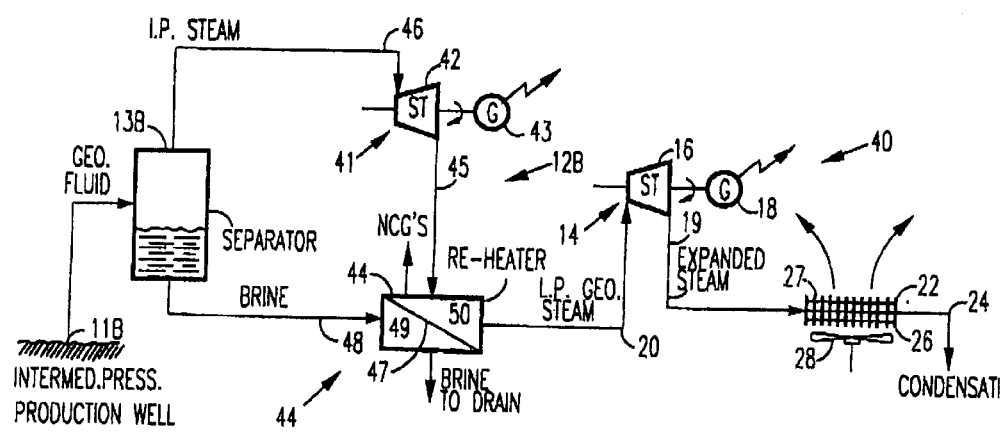
FIG. 2 is a block diagram of a geothermal power plant according to the present invention for utilizing geothermal fluid produced by an intermediate pressure production well.
Figure 3:
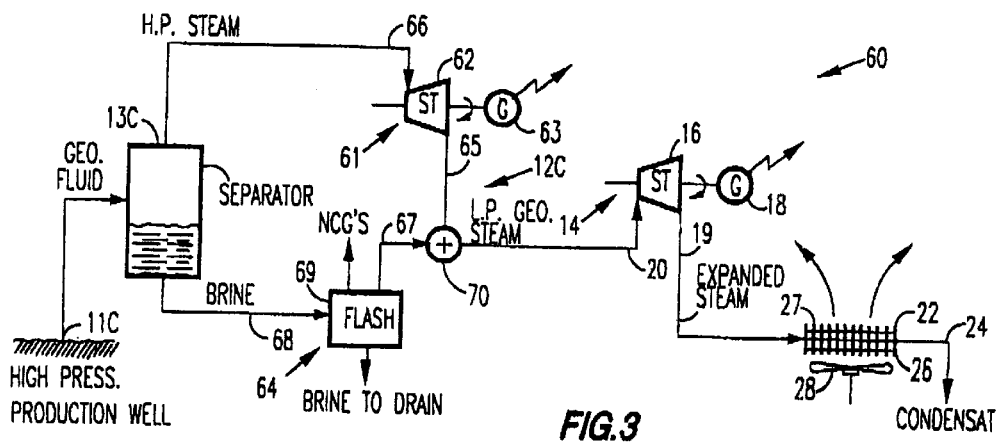
FIG. 3 is a block diagram of a geothermal power plant according to the present invention for utilizing geothermal fluid produced by a high pressure production well.

In some fields, production wells produce higher pressure geothermal fluid. Typically, a well that produces geothermal fluid which, after separation into brine and steam that have a temperature in the range of about 131–160° C., is referred to as an intermediate pressure well. A well that produces geothermal fluid at a higher pressure, i.e. above about 160° C., is referred to as a high pressure well. The invention is also applicable to both types of wells. Power plant 40 shown in FIG. 2 is the preferred design for geothermal fluid of intermediate pressure produced by production well 11B; and power plant 60 shown in FIG. 3 is the preferred design for geothermal fluid of high pressure produced by production well 11C.

Power plant 40 comprises source 12B of low pressure geothermal steam, and turbo-generator 14 which includes low pressure steam turbine 16 coupled to generator 18. Conduit 20 supplies the low pressure steam to turbine 16 wherein the steam is expanded driving the attached generator and producing exhaust steam in conduit 19 that is condensed in condenser 22 as described above. In this embodiment of the invention, like reference numerals designate like components in the other embodiments.

Source 12B includes separator 13B, turbo-generator 41 that includes primary steam turbine 42 coupled to generator 43, and primary heat exchanger 44. Separator 13B receives intermediate pressure geothermal fluid from well 11B and separates the fluid into two streams, one containing steam at a temperature of between 131° C. to 160° C. that exits into conduit 46, and the other containing brine that exits into conduit 48.

Conduit 46 applies intermediate pressure geothermal steam from separator 13B to the primary steam turbine (which, in this case, is an intermediate pressure steam turbine) wherein expansion of the steam takes place driving generator 43 which produces electricity, and producing primary expanded steam in exhaust line 45. Primary heat exchanger 44 receives the primary exhaust steam via conduit 45, and brine via conduit 48, reheating the primary exhaust steam and producing low pressure geothermal steam that exits via conduit 20.

In power plant 40, which utilizes intermediate pressure geothermal steam produced by the separator, primary heat exchanger 44 is constituted by indirect contact reheater 46 having a heat transfer surface 47 that divides the heat exchanger into sides 49 and 50. Side 49 receives brine from the separator; and side 50 receives primary expanded steam exhausted from the primary turbine. Heat in the brine is transferred through surface 47 to the primary exhaust steam thus reheating the steam which exits via conduit 20 and constitutes low pressure geothermal steam described above. This low pressure geothermal steam is applied to low pressure turbine 16 of turbo-generator 14 whose operation is the same as that described above.

In this embodiment of the invention, non-condensable gases are preferably removed from side 50 of reheater 46 to enhance the heat transfer characteristics of the reheater.

Power plant 60 comprises source 12C of low pressure geothermal steam, and turbo-generator 14 which includes low pressure steam turbine 16 coupled to generator 18. Conduit 20 supplies the low pressure steam to turbine 16 wherein the steam is expanded driving the attached generator and producing exhaust steam in conduit 19 that is condensed in condenser 22 as described above. In this embodiment of the invention, like reference numerals designate like components in the other embodiments.

Source 12C includes separator 13C, turbo-generator 61 that includes primary steam turbine 62 coupled to generator 63, and primary heat exchanger 64. Separator 13C receives high pressure geothermal fluid from well 11C and separates the fluid into two streams, one containing steam at a temperature of above 160° C. that exits into conduit 66, and the other containing brine that exits into conduit 68.

Conduit 66 applies high pressure geothermal steam from separator 13C to the primary steam turbine (which, in this case, is a high pressure steam turbine) wherein expansion of the steam takes place driving generator 63 which produces electricity, and producing primary expanded steam in exhaust line 65. Primary heat exchanger 64 receives brine via conduit 68, and produces low pressure geothermal steam that exits the primary heat exchanger and is combined with primary exhaust steam in conduit 65 to produce low pressure geothermal steam in conduit 20.

In power plant 60, which utilizes high pressure geothermal steam produced by the separator, primary heat exchanger 64 is constituted by flash chamber 69 for receiving brine from conduit 68 and producing flashed steam at a temperature higher than the temperature of the primary expanded steam in conduit 65. The flashed steam exits chamber 65 in conduit 67 and is combined at 69 with the primary expanded steam. The combination constitutes low pressure geothermal steam in conduit 20 described above. This low pressure geothermal steam is applied to low pressure turbine 16 of turbo-generator 14 whose operation is the same as that described above.

In this embodiment of the invention, non-condensable gases are preferably removed from chamber 69 to enhance the heat transfer characteristics of condenser 22.

In the embodiments described above, steam turbine 14 is a steam condensing turbine, while steam turbine 41 in FIG. 2 and steam turbine 61 in FIG. 3 are back pressure steam tubines.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A geothermal power plant operating on geothermal fluid comprising:
    (a) a source of low pressure geothermal steam derived from said fluid;
    (b) a turbo-generator including a low pressure steam turbine coupled to a generator;
    (c) means that apply steam from said source to said turbine wherein expansion of the steam takes place driving the generator which produces electricity, and produce expanded steam;
    (d) a condenser that condenses said expanded steam; and
    (e) said condenser including a steam heat exchanger that receives said expanded steam, and a fan for cooling said expanded steam.

2. A geothermal power plant according to claim 1 wherein said condenser includes:
    (a) a plurality of finned tubes in which said expanded steam flows; and
    (b) said fan operates to cool the expanded steam flowing in said finned tubes with ambient air by inducing the ambient air to flow over the finned tubes and produce steam condensate.

3. A geothermal power plant according to claim 1 wherein said low pressure geothermal steam contains non-condensable gases, and including means that remove said non-condensable gases from said condenser.

4. A geothermal power plant according to claim 1, wherein said geothermal fluid includes non-condensable gases, and including means that remove non-condensable gases from said low pressure steam before it is applied to said turbine.

5. A geothermal power plant according to claim 1, wherein said source of geothermal steam includes a separator that receives geothermal fluid and separates the fluid into steam and brine, said low pressure geothermal steam being derived from said steam.

6. A geothermal power plant according to claim 5, wherein said low pressure geothermal steam includes non-condensable gases, including means that remove non-condensable gases from said condenser.

7. A geothermal power plant according to claim 1, wherein said source of said geothermal steam includes:
    (a) a separator that receives geothermal fluid and separates the fluid into two streams, one containing steam, and the other containing brine;
    (b) a primary turbo-generator that includes a steam turbine coupled to a generator;
    (c) means that apply said steam from said one stream to the steam turbine of said primary turbo-generator, expansion of steam in the last mentioned steam turbine driving said generator which produces electricity, and producing primary exhaust steam; and
    (d) a primary heat exchanger that receives said primary exhaust steam and brine from said other stream and produces said low pressure geothermal steam.

8. A geothermal power plant according to claim 7, wherein said primary heat exchanger is an indirect contact reheater having two sides, one that receives said brine, and the other side that receives said primary exhaust steam which is reheated to form said low pressure geothermal steam.

9. A geothermal power plant according to claim 8, including means that remove non-condensable gases from the side of the reheater receiving said exhaust steam.

10. A geothermal power plant according to claim 7 including a flash chamber that receives brine and produces flashed steam that is combined with said expanded steam forming said low pressure geothermal steam.

* * * * *

UNITED STATES PATENT AND TRADEMARK OFFICE
CERTIFICATE OF CORRECTION

PATENT NO. : 6,212,890 B1
DATED : April 10, 2001
INVENTOR(S) : Nadav Amir

It is certified that error appears in the above-identified patent and that said Letters Patent is hereby corrected as shown below:

Column 6, claim 10,
Line 43, delete the number "7" and insert the number -- 1 --.
Line 46, before the phrase "low pressure geothermal steam", delete the word "said".

Signed and Sealed this

Eighteenth Day of December, 2001

Attest:

Attesting Officer

JAMES E. ROGAN
Director of the United States Patent and Trademark Office